US009527139B2

(12) United States Patent
Mellström

(10) Patent No.: US 9,527,139 B2
(45) Date of Patent: Dec. 27, 2016

(54) CLAMPING CHUCK WITH INTEGRATED DRAWBAR

(71) Applicant: SYSTEM 3R INTERNATIONAL AB, Vällingby (SE)

(72) Inventor: Erik Mellström, Järfälla (SE)

(73) Assignee: System 3R International AB, Vällingby (SE)

( * ) Notice: Subject to any disclaimer, the term of this patent is extended or adjusted under 35 U.S.C. 154(b) by 195 days.

(21) Appl. No.: 14/201,275

(22) Filed: Mar. 7, 2014

(65) Prior Publication Data
US 2014/0252726 A1 Sep. 11, 2014

(30) Foreign Application Priority Data
Mar. 8, 2013 (EP) ..................................... 13158307

(51) Int. Cl.
| | | |
|---|---|---|
| *B23B 31/113* | (2006.01) | |
| *B23B 31/24* | (2006.01) | |
| *B23Q 1/00* | (2006.01) | |
| *B25B 5/06* | (2006.01) | |

(52) U.S. Cl.
CPC ............. *B23B 31/24* (2013.01); *B23B 31/113* (2013.01); *B23Q 1/0063* (2013.01); *B23Q 1/0081* (2013.01); *B23B 2231/00* (2013.01); *B23B 2240/04* (2013.01); *B25B 5/062* (2013.01); *Y10T 279/1224* (2015.01); *Y10T 279/275* (2015.01)

(58) Field of Classification Search
CPC ........ B23B 31/113; B23B 31/24; B23B 31/30; B23B 2240/04; B23B 2231/00; B23Q 1/0063; B23Q 1/0081; B25B 5/062; Y10T 279/1224; Y10T 279/275; Y10T 279/17863; Y10T 279/17888
See application file for complete search history.

(56) References Cited

U.S. PATENT DOCUMENTS

| | | | | | |
|---|---|---|---|---|---|
| 3,948,502 | A | * | 4/1976 | Waller | ................ F15B 15/063 269/27 |
| 3,986,617 | A | * | 10/1976 | Blomquist | ........... B23Q 7/1431 198/346.1 |
| 4,855,558 | A | * | 8/1989 | Ramsbro | ................. B23H 7/26 219/69.15 |
| 6,530,568 | B2 | * | 3/2003 | Etter | ...................... B23B 31/22 269/309 |

(Continued)

FOREIGN PATENT DOCUMENTS

| | | |
|---|---|---|
| DE | 4114295 A1 | 11/1992 |
| DE | 4139317 A1 | 6/1993 |

(Continued)

*Primary Examiner* — Eric A Gates
*Assistant Examiner* — Chwen-Wei Su
(74) *Attorney, Agent, or Firm* — Bachman & LaPointe, P.C.

(57) ABSTRACT

A clamping device for machine tools, comprising a chuck (1.1) and a drawbar (1.2) for clamping separate pallets (1.3), with a bayonet-connection via rotational motion of that drawbar (1.2). Rotational motion of the drawbar (1.2) is guided and determined by means (2.5, 2.7, 2.6, 2.4, 2.12, 3) provided in the chuck housing (2.3) interacting with the drawbar (1.2, 2.13). The drawbar (1.2) is turnable mounted in the chuck (1.1) to impede the drawbars extraction out of the chuck, independent if the drawbar (1.2) is in clamping or unclamped condition.

16 Claims, 6 Drawing Sheets

3D-view of the clamping chuck and pallet

(56) References Cited

U.S. PATENT DOCUMENTS

| | | | | |
|---|---|---|---|---|
| 2002/0144751 A1* | 10/2002 | Marchioro | ............... | B25B 5/061 144/242.1 |
| 2003/0189279 A1* | 10/2003 | Yonezawa | ............... | B25B 5/062 269/24 |
| 2009/0038471 A1* | 2/2009 | Tanaka | ............... | B25B 5/062 92/187 |
| 2012/0056387 A1 | 3/2012 | Kramer | | |
| 2014/0109759 A1* | 4/2014 | Yokota | ............... | B25B 5/061 91/167 R |

FOREIGN PATENT DOCUMENTS

| | | | |
|---|---|---|---|
| EP | 2371478 A2 | * | 10/2011 |
| WO | 2010130408 A1 | | 11/2010 |

* cited by examiner 3D-view of the clamping chuck and pallet

Top-view of the clamping chuck and pallet, drawbar in locked position

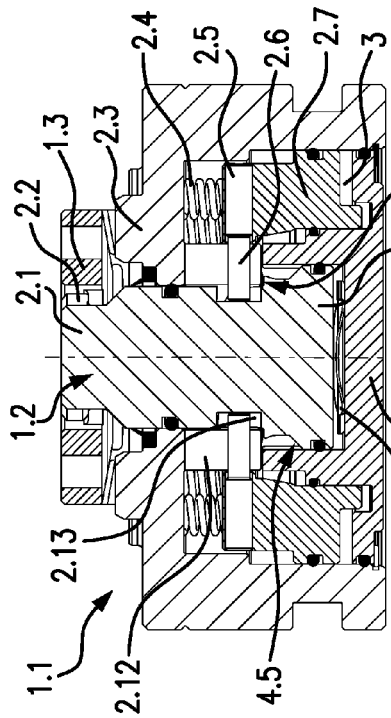
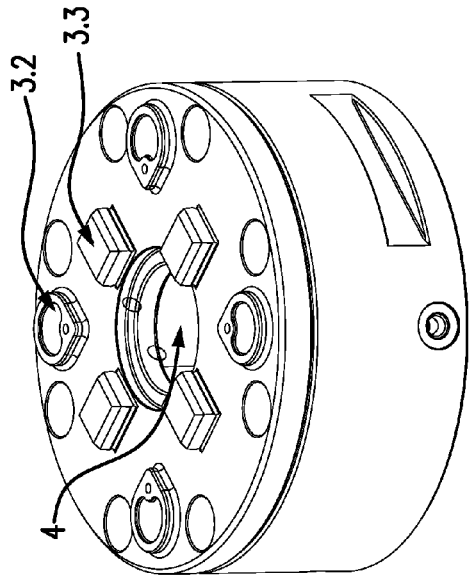
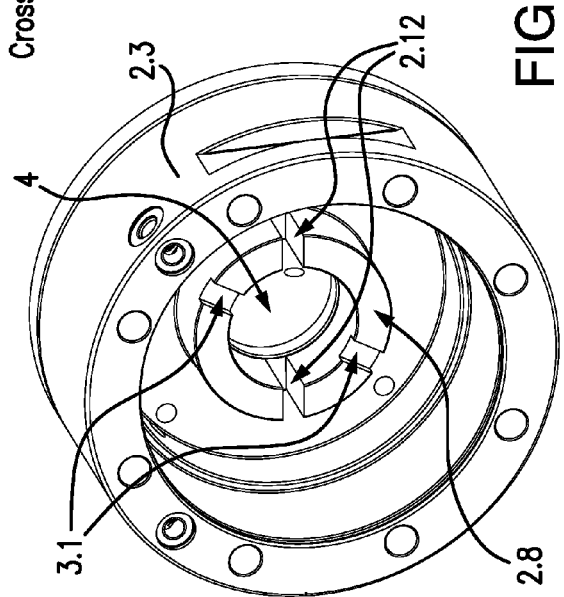
FIG. 2 Cross-section of the clamping chuck and pallet
FIG. 3 Clamping chuck housing Drawbar with S-shaped spiral guiding grooves Hollow version of the drawbar

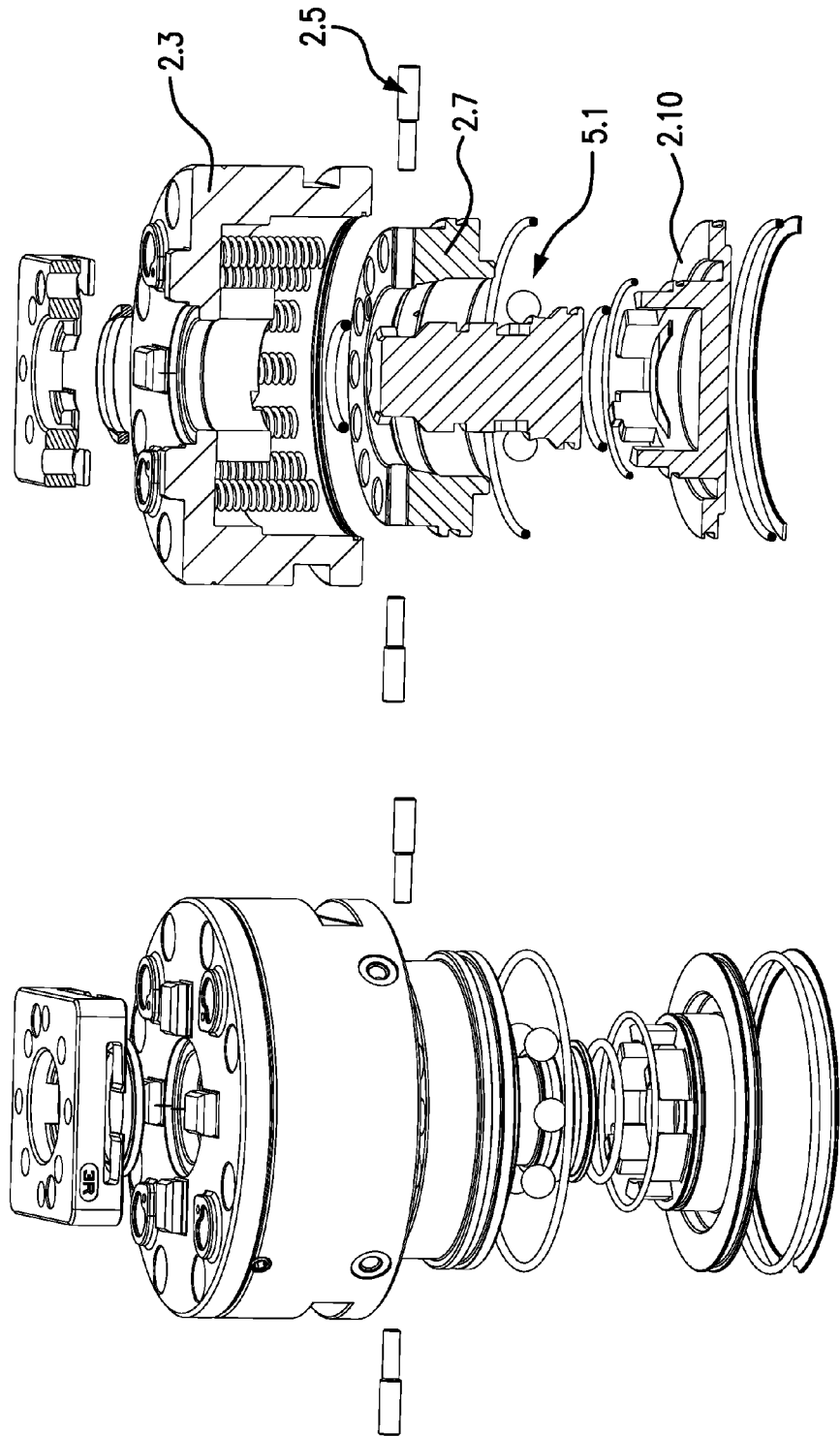
FIG. 5  Clamping chuck complete, "exploded" view and cross-section for visualization

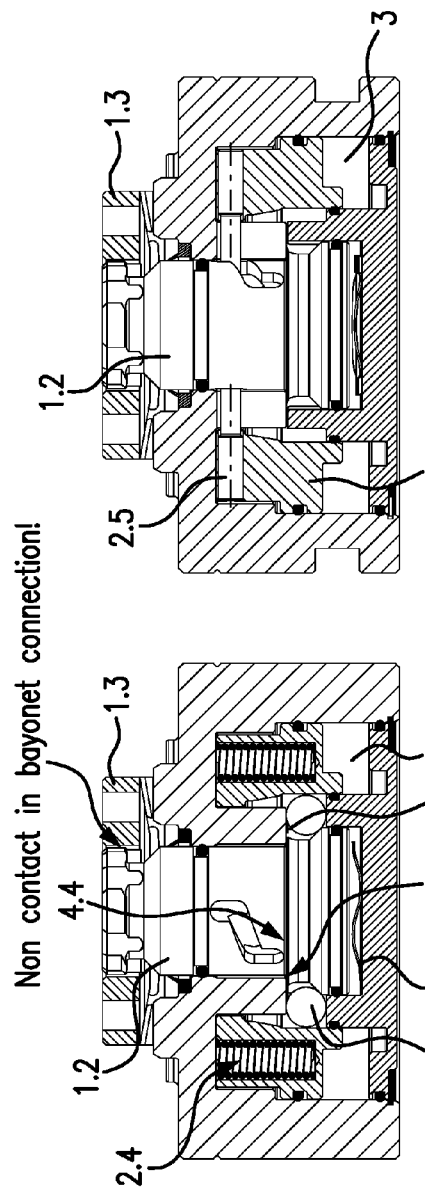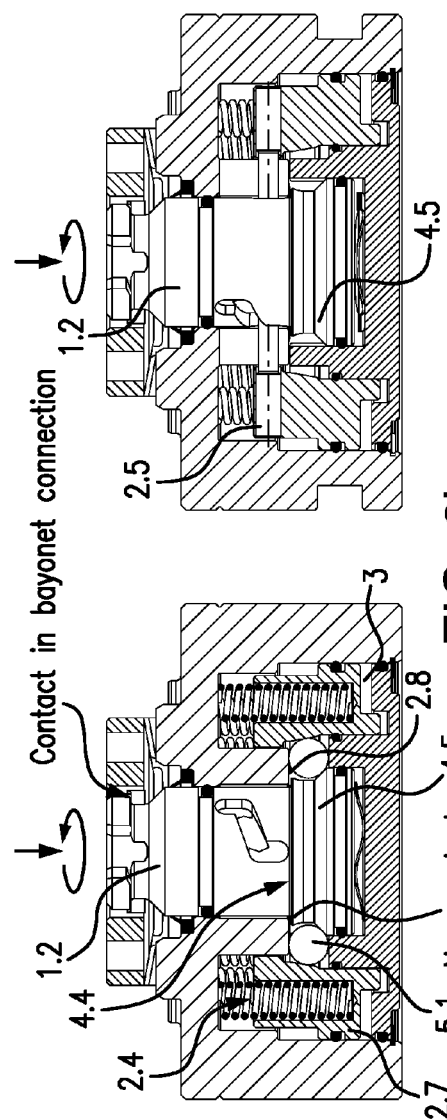

Hollow version of the clamping chuck, side and top view

CLAMPING CHUCK WITH INTEGRATED DRAWBAR

BACKGROUND OF THE INVENTION

The present invention relates to a clamping device for machine tools comprising a chuck and a drawbar.

Clamping devices for machine tools are generally known. The European patent application EP 255 042 A1 discloses for instance such a device.

The EP 255 042 A1 describes a clamping device known to the market as the "Macro chuck" of the applicant System 3R. It uses clamping balls to lock the drawbar of the pallet in the clamped position. The drawbar is loosely connected to the pallet by a bayonet connection. The drawbar is further loosely inserted into the chuck and only held by the clamping balls at clamping. This ensures that no side forces are exerted on the pallet at the moment of clamping. Side forces generally have a negative effect on the accuracy of the clamping system, generating positioning errors. It is a prerequisite for the invention to ensure a high position accuracy.

The Macro chuck described in the EP 255 042 A1 has a very strong holding force, generated from the installed springs as from the simultaneously and additionally exerted pneumatic force applied on the clamping balls and consequently on the draw bar (this feature of the Macro chuck is the so called turbo function). In some installations like turning machines without an air swivel etc. it is however not possible to apply an additional pneumatic force during the machining process, i.e. compressed air is not available.

Another publication, the EP 2 052 808 A1, describes a clamping chuck with sensing function for detection of locked or unlocked status. The sensing function detects the position of the clamping elements. The sensing function is in itself also a possible source of failure.

The EP 195 29 22 A1 describes a clamping chuck having a number of wedge elements for locking workpiece holder. By using wedge elements instead of e.g. clamping balls the contact surface is increased. By that, the maximum holding force is said to be increased. This chuck however doesn't make use of a drawbar but directly clamps workpiece holder resp. its specific pallet for workpieces. A loosely connected drawbar is however a prerequisite for achieving a high position accuracy of the pallet. The invention described afterwards maintain the loose connection between the drawbar and the separate pallet to be clamped.

Similar clamping devices like the EP 195 29 22 A1 functioning without drawbar are disclosed in the documents U.S. Pat. No. 5,190,272 or EP 1 068 919 A1.

The devices of EP 195 2922 A1 and the other foregoing mentioned publications might have their advantages, but—apart the mentioned positioning accuracy and space problem—can cause potentially severe safety problems, since the wedge elements are just spring loaded in the clamped position and—in case the spring load should result in being insufficient—the pallet is not mechanically fully safe locked into the chuck.

A further disadvantage of all forgoing mentioned clamping devices relies in their storage and handling ability: The Macro system disclosed in the EP 255 042 A1 has the drawbar preconnected to the pallet. This is of advantage for example for the storage of hanging EDM electrodes. For that, grooves in the drawbar are used for storage in fork receivers in the magazine. Other grooves in the drawbar are used for the gripping by a pallet changer. However, for standing pallets a preconnected drawbar is a disadvantage. Standing pallets are often loaded in table chucks in milling machines or in horizontal spindle chucks in turning machines. A preconnected drawbar is an obstacle for an easy handling of the loading process in both cases. Further on, the distance between the magazine shelves in the pallet changer has to be longer when the drawbar is preconnected to the pallet (see e.g. EP 195 2922 A1, functioning without drawbar but with a specific pallet of long dimension). This is in order not to collide with the robot gripper. The result is a shorter allowable height of the workpieces, leading to a limitation of the capacity of the pallet changer.

Pallets like the ones published in the documents U.S. Pat. No. 5,190,272 or EP 1 068 919 A1 allow a shorter distance between the shelves. However, this type of pallet systems do not meet the requirements of clamping without side forces. This since they don't have a loosely connected drawbar or similar solution to transmit the clamping force from the chuck to the pallet in a pure axial way.

Clamping chucks must hold the workpiece pallet with a sufficiently high pull-in force with respect to the external forces e.g. cutting forces from machining. This is not a problem at machining of EDM electrodes as the copper or graphite are of soft materials. In other applications such as turning and milling machines for the working of steel parts sudden high forces can occur, especially at a tool breakage. In such cases the workpiece and also the pallet could be damaged. Despite this, for safety reasons it has to be ensured that in the worst case the pallet holding the workpiece can never get lost from the chuck. This is a main issue for the present application.

It is an object of the present invention to provide a clamping system with an improved storage and handling ability and additionally a safety locking function ensuring that the pallet cannot get lost from the chuck in case the ordinary operational clamping force is overcome for whatever reason (e.g. due to an incident like a tool breakage or other circumstances that will lead to very high external forces overcoming the ordinary clamping mechanism). This objective shall also be reached in devices using loosely connected drawbars to transmit the clamping force from the chuck to the pallet in a pure axial way or situations were compressed air is not available.

SUMMARY OF THE INVENTION

The object of the invention is achieved by providing a clamping device for machine tools with an integrated drawbar wherein the drawbar is integrated in a chuck according to the present invention and connected to the separate pallet by a bayonet connection. The drawbar is rotated by means contained in the chuck, which force the drawbar to a determined predefined rotational movement.

Further, in case of high overload, the drawbar could be pulled out when the clamping balls are pressed back. Without the inventive means, the pallet could then get completely loose and eventually be extracted out of the chuck, leading to severe risk for danger and damage. This problem is solved by the invention thanks to its safety locking function, meaning the form-locking mounting of the drawbar in the chuck, impeding mechanically that the drawbar can be pulled out of the chuck in case the ordinary operational clamping mechanism resp. the respective exerted clamping forces should be overcome for whatever reason and couldn't withhold the drawbar in the chuck.

Although form-locking mounted, the drawbar is turnable mounted and loosely positioned in the inner guidance channel 4 of the inventive chuck. This feature permits a clamping of the pallet without the possibility to exert any side forces, ensuring therewith the required high position accuracy of the clamped pallet. The ordinary and operational clamping function in the inventive chuck is effected with a conventional mechanism, e.g. ball clamping.

The loosely but form-locking mounting of the drawbar in the inner guidance channel 4 impedes that the drawbar can be extracted out of the chuck—particularly against the pull direction of the drawbar—of course independently if the drawbar is in clamping or unclamped condition.

For the clamping operation the drawbar will be turned and connected therewith to the pallet via its form-lock and pulled-in towards the chuck with a conventional mechanism. This sequence is reversed at unclamping.

The inventive safety locking function does by the way not increase the allowed cutting force as it works only after the pallet has lost its z-reference contact with the chuck. The position accuracy is then also lost. The safety locking function is thereby only a safety function.

Apart to the inventive safety locking function, the invention also presents a special mechanical solution for the turning and pulling/lifting the drawbar.

The inventive chuck and its function will be explained in the following with the help of figures illustrating one possible example of the inventive clamping device. It should be noted, that the following figures show just one of many possible embodiments for the inventive chuck.

BRIEF DESCRIPTION OF THE DRAWINGS

FIG. 2 is a cross-section view of the clamping chuck of FIG. 1a;

FIG. 3 illustrates two views of the clamping chuck housing;

FIG. 5 illustrates the clamping chuck in exploded view and sectional exploded view;

FIGS. 6a and 6b show the clamping chuck in open position and closed position in 0 degree and 90 degree views.

DETAILED DESCRIPTION

Figure 1A:
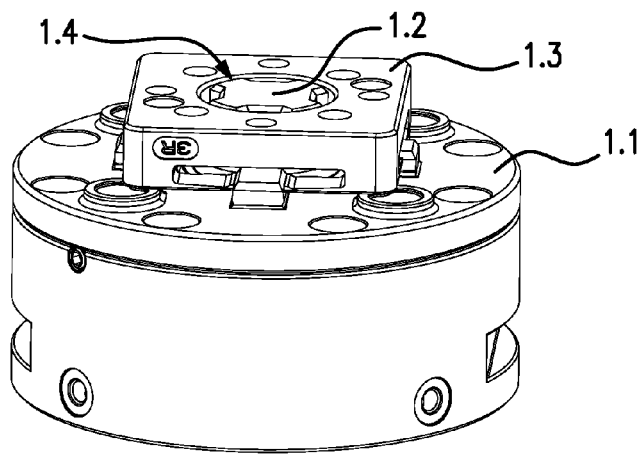
FIGS. 1a and 1b show a 3-view of a clamping chuck with integrated drawbar according to the invention.
Figure 1B:
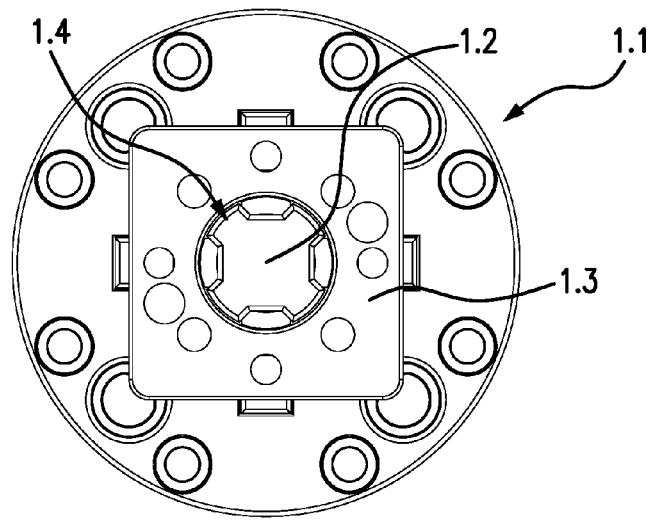

The FIG. 1a shows a 3-view of the clamping chuck 1.1 with integrated drawbar 1.2 according the invention and a pallet 1.3. The clamping chuck is normally mounted on the table or on the spindle of a machine tool. The drawbar is connected to the pallet by a bayonet connection resp. the bayonet wings 1.4. The FIGS. 1a and 1b illustrate the drawbar in the rotational form-locking position in respect of the pallet 1.3 (see position of the bayonet wings 1.4 of the drawbar 1.2). The unlocked position is reached if the drawbar is turned about 45 degrees (clockwise). The FIG. 1b shows the same clamping chuck 1.1, drawbar 1.2 and pallet 1.3 as displayed in FIG. 1a from the top.

The FIG. 2 shows a cross-section of the clamping chuck 1.1 with pallet 1.3 comprising a chuck housing 2.3, a drawbar 1.2 with upper portion 2.1, having a bayonet connector 2.2 geometry, and a lower portion 2.9, having a tapered portion 4.5 (see also FIG. 4a) for the clamping ball contact. The lower portion has two opposite S-shaped guiding grooves 2.13. The drawbar 1.2 is loosely mounted in an inner guidance channel 4 of the chuck 1.1 (see also next FIG. 3). Two guiding pins 2.5, with slightly thinner front ends 2.6, are entering into the guiding grooves 2.13. The guiding pins 2.5 are kept rigidly fixed in radial holes in the clamping piston 2.7. The clamping piston 2.7 is rotationally locked by the guiding pins 2.5 as they are going through the guiding openings 2.12 (see FIGS. 2 and 3) allocated in the inner guidance channel 4 (see also next FIG. 3) of the chuck 1.1 respectively of the chuck housing 2.3. The springs 2.4 are acting on the clamping piston 2.7, pushing it down to the clamping position, when compressed air is released via air outlets (not displayed) out of the pressure chamber 3, similar to the cited EP 255 042 A1. An additional clamping force can optionally be generated by compressed air inlets (not displayed) on the spring side, also similar to EP 255 042 A1. The chuck 1.1 has a bottom cover 2.10 mounted below the clamping piston 2.7. A compression spring 2.11 is acting between the bottom cover 2.10 and the drawbar 1.2. The compression spring 2.11 ensures a contact between the drawbar 1.2 and the end surface 2.8 of the inner guidance channel 4 (see also FIG. 3) when the chuck is in unclamped respectively open condition. This contact ensures also an axial gap in the bayonet connection between a pallet and the drawbar 2.1 at the beginning of every clamping, reference is also made to FIGS. 6a,b.

The FIG. 3 shows the chuck housing 2.3. The face of the housing—see picture on the right side—is provided with a coupling interface having xyz reference elements with corresponding reference surfaces for positioning of the pallet. The x-y reference elements consist of tapered rails 3.3 in a cross. The z reference elements consists of protruding posts 3.2 with z surface. The Figure shows also two grooves 3.1 in the inverted sleeve forming the inner guidance channel 4. The function of these grooves is to orientate the chuck bottom cover 2.10 with its openings (seen in FIG. 2 or 5) for holding and positioning the clamping balls. The clamping balls must be correctly placed with respect to the guiding pins 2.6 and the grooves 3.1 as the balls are pressed against the inner end contact surface 2.8 of the inverted sleeve resp. inner guide channel 4 in clamping condition. The clamping balls are not in contact with the grooves 3.1. In clamping condition the drawbar 1.2 is slightly pulled inwards, respectively in direction of the chuck bottom cover 2.10. The before mentioned axial gap in the bayonet connection between the pallet to be clamped and the drawbar 1.2 is therewith closed. The guiding openings 2.12 for the thinner portion 2.6 of the pins 2.5 are also shown.

Figure 4A:
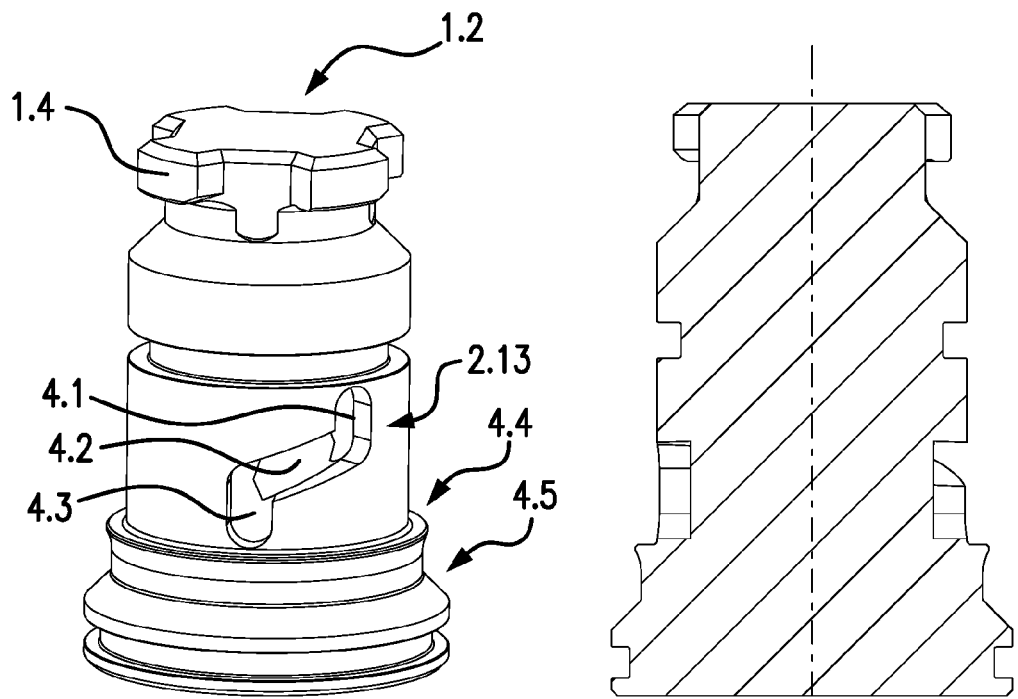
FIGS. 4a and 4b illustrate the S-shaped spiral grooves on a solid and hollow embodiment of a drawbar of FIG. 2.

The FIG. 4a illustrates a further inventive mechanical solution for the turning and pulling/lifting the drawbar. The right Figure in FIG. 4a shows a cross section of the drawbar. The displayed drawbar 1.2 has S-shaped guiding grooves 2.13 allowing—suitably mechanically combined with other elements of the chuck—a partial rotation of that drawbar. Each guiding groove 2.13 consists of a first axially oriented straight groove portion 4.1, an intermediate angled groove portion 4.2 and a second axially oriented straight groove portion 4.3. The function of the first groove portion 4.1 is to ensure that the bayonet is oriented in an unlocked bayonet position. This allows the bayonet wings 1.4 of the drawbar and pallet to pass each other when the pallet is placed onto the clamping chuck. The function of the angled groove portion 4.2 is to force the drawbar to rotate when the guiding pins 2.6 are moved with the clamping piston at clamping. The degree of rotational motion can be deliberately chosen and can amount—just as an example—to 45 degrees. The 45 degree motion is particularly suitable in cases when four bayonet wings 1.4 are used. The rotational motion of the drawbar is intended to lock or open the bayonet connection.

The function of the second groove portion 4.3 is dual. The first function is to ensure that there is no rotational motion at the exact moment when the drawbar 2.1 is pulled in by the clamping balls, clamping therewith the connected pallet. A rotational motion would generate a torque and side forces that both would affect the position accuracy of the pallet. Further on, to force a rotation of the bayonet connection pallet—drawbar with existing friction would hinder a free and reliable movement of clamping piston 2.7 and lead consequently to jamming of the spring loaded clamping piston 2.7. The second function of the straight groove portion 4.3 is to ensure that the drawbar 1.2 cannot further rotate and remains in the bayonet locked position once the chuck clamping occurs via the clamping balls. This gives the safe holding function. The bayonet connection remains in locked position, regardless of the magnitude of external pull-out forces on the pallet. To permit the inventive safety locking function, the drawbar 1.2 includes in its lower portion a tapered portion 4.5 for the clamping ball contact and a ring shaped axial stop surface 4.4 which interacts with the end contact surface 2.8 of the inner guidance channel 4 (see e.g. FIG. 2). Further reference is made here to the following FIGS. 6a and 6b.

Figure 4B:
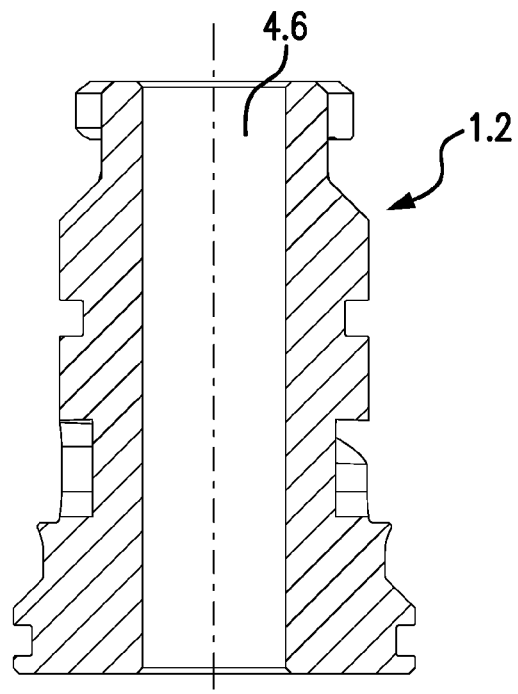

The FIG. 4b shows the drawbar 1.2 in a hollow version. The hollow drawbar has a through-going channel 4.6. The hollow drawbar enables a complete hollow chuck version as will be showed in FIG. 7.

The FIG. 5 shows the clamping chuck and pallet of the forgoing figures in an "exploded" view and cross-section. The shiftable clamping piston 2.7, its guiding pins 2.5, the chuck housing 2.3, the clamping balls 5.1 and the bottom cover 2.10 are well visible.

The FIG. 6a shows the clamping chuck in open position. The expandable pressure chamber 3 below the clamping piston is filled with compressed air through a (not shown) air inlet. The clamping piston 2.7 with guiding pins 2.5 is in its upper position. The spring 2.11 is acting on the drawbar 1.2 leading to a contact between the drawbars 1.2 stop surface 4.4 and the end surface 2.8 of the inner guidance channel 4 resp. the inverted collar. This contact is a prerequisite for having a reliable rotational motion of the drawbar—no friction between drawbar and the separate pallet 1.3 occurs—when the guiding pins 2.5 are following the clamping piston 2.7 upwards in release resp. unclamping position and likewise downwards at clamping.

The FIG. 6b shows the inventive chuck in clamped position. The compressed air was left to escape from the variable pressure chamber 3, which caused the forces exerted by the springs 2.4 to shift the clamping piston 2.7 downwards. The guiding pins 2.5 integrated in the piston 2.7 forced the drawbar 1.2 on the other hand to a partial rotational motion, form-locking therewith the separate pallet with the upper drawbar end. The clamping balls 5.1 are acting on the tapered portion 4.5 of the drawbar 1.2 during the last part of the clamping piston 2.7 motion, pulling the drawbar 1.2 inwards the chuck. The displayed clamping mechanism with the clamping balls 5.1 exerts a high pulling-in force on the drawbar. This pull-in force exceeds many times the spring force exerted by the spring 2.11 or even by the spring 2.4 and causes a relatively small movement of the drawbar 2.1 towards the chuck, closing therewith the axial gap between the drawbar and the pallet which get in contact with each other.

In the exceptional case of very high external pull-out forces, the clamping balls 5.1 are also forced out in radial direction leading to a small motion upwards of the clamping piston. In contrast to the known devices of the state of the art however, the drawbar can just be moved upwards for a very short distance until the gap marked in FIG. 6b with "Non contact" has been closed, meaning until the stop surface 4.4 of the drawbar touches the inner end contact surface 2.8 of the inner guidance channel. This contact stops the pull-out motion definitely, resulting in the inventive safety holding function. It should be noted here, that the bayonet form-lock between the pallet and the drawbar remains secured against any rotation also during these circumstances thanks to the groove portions 4.3 foreseen in the drawbar 1.2 and the guiding pins 2.5 in the clamping piston 2.7. The positioning accuracy is of course lost if such an exceptional case should occur. This means that at very high external forces (e.g. tool breakage) the pallet position is lost but, most important, the pallet cannot leaving the chuck!

Figure 7:
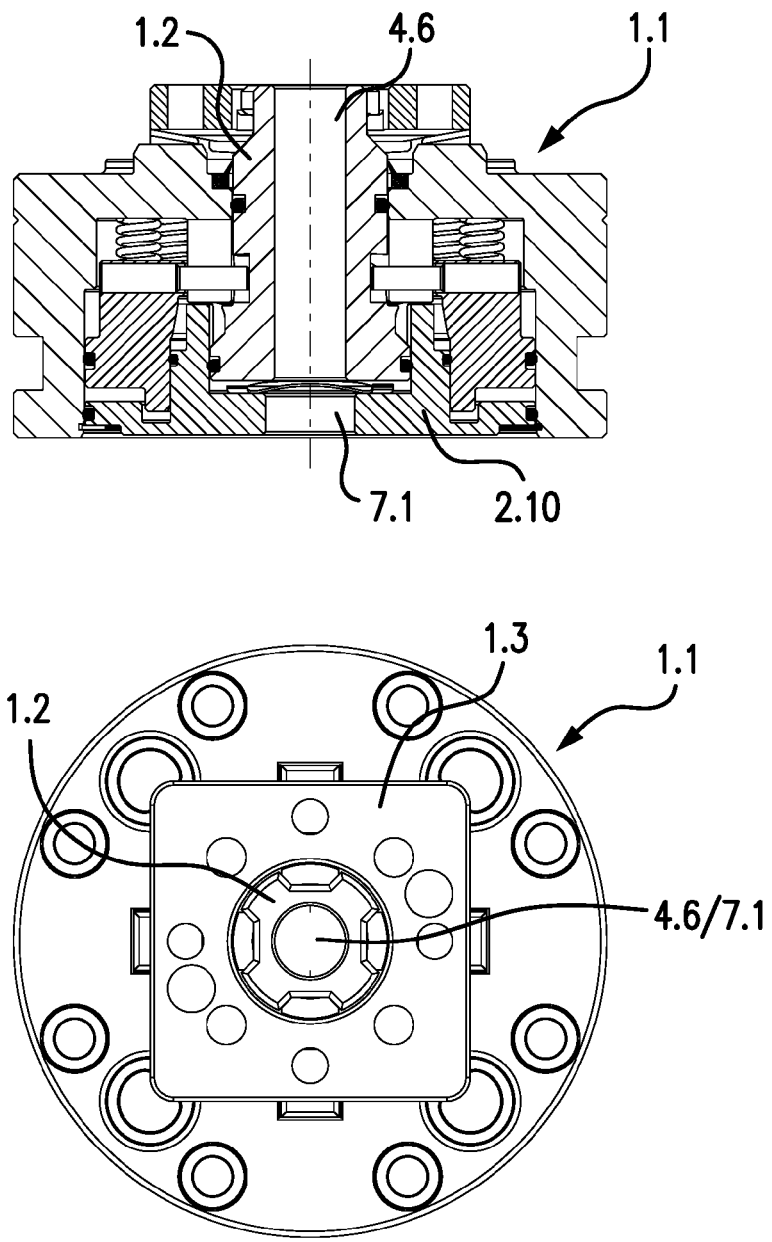
FIG. 7 shows two views of a hollow version of the clamping chuck.

The FIG. 7 shows the clamping chuck 1.1 in its hollow version. The chuck is also provided with the hollow version of the inventive drawbar (see version according to FIG. 4b and foregoing description). The chuck has further a through-going hole 7.1 in the bottom plate 2.10. The hollow chuck could be used for applications where media (e.g. air, water, electrical power, sensor signals) are transferred to the pallet and workpiece. In other applications the central channel could be used for placement of an extended portion of the workpiece e.g. a shank portion or to allow chip removal as showed for example in the EP 1 741 511 B1, FIG. 13.

The diameter of the hollowness, by the channel 4.6 in the inventive drawbar 1.2 and through-going hole 7.1 in the chuck 1.1 resp. bottom cover 2.10 could vary within a wide range and also be large with respect to the outer diameter of the chuck 1.1.

The invention relates therefore to clamping devices for machine tools, which comprise a chuck and a drawbar intended to clamp separate pallets, whereby the drawbar possesses at least one projection for entering a form-locking connection with a separate pallet (bayonet-connection) by a rotational motion of the drawbar. According to the invention the chuck has an inner guidance channel in which the drawbar is loosely positioned respectively mounted. The rotational motion of the drawbar is guided and determined by inventive means contained in the chuck, which interact with said drawbar. The drawbar is turnable journalled mounted in the inner guidance channel, but on the other hand form-locking designed in respect to the inner guidance channel of the chuck in that way to impede the drawbars extraction out of the chuck, in particularly independent if the drawbar is in clamping or unclamped/open condition.

In a preferred embodiment of the invention, the drawbar is designed either as a hollow sleeve or as a massive element. The drawbar can be composed of one or more parts.

The inventive clamping device contains in its inner guidance channel an end contact surface which faces a corresponding stop surface on the drawbar. These corresponding surfaces are form-locking designed and impede therewith the drawbar's extraction out of the chuck (meaning against the pulling direction of the drawbar). Preferably the end contact surface is orthogonally aligned to the axis of the guidance channel in the chuck. According to the invention, the drawbar has a projection forming the drawbar's stop surface, preferably that projection is a ring shaped shoulder. However it could have also different further forms (e.g. a projection, a ring segment formed shoulder etc.)

The inventive drawbar has at least one, preferably two, guiding grooves at its cylindrical surface. These guiding grooves are preferably S-shaped, most preferably with two axially oriented and from each other displaced arranged straight groove portions and one intermediate angled groove portion, connecting both straight groove portions.

The guiding grooves interact with corresponding guiding pins contained in an inner, preferably annular formed, clamping piston which is allocated within the chuck housing. The inner clamping piston is axially shiftable within the chuck housing, however without the ability to conduct a rotational motion. The guiding pins—allocated and interacting with the guiding grooves of the drawbar—cause the draw bar to fulfill a guided and determined rotational motion around its own axis once the clamping piston is moved in the axial direction of the chuck housing (2.3). Preferably the guiding grooves in the drawbar are dimensioned in such a way to allow a rotational movement of the draw bar of 45 degrees.

The chuck housing has a bottom cover. The drawbar has a tapered lower end section which is in contact with clamping elements, preferably balls or rollers, allocated between said tapered lower end section of the drawbar and a also tapered section of the inner clamping piston. A relative movement of the inner clamping piston in direction of the bottom cover of the chuck resp. chuck housing causes the clamping elements to pull and press the drawbar in the clamping chuck. The chuck housing further contains springs, which are acting on the inner clamping piston, pressing the inner clamping piston in direction of the bottom cover. An expandable pressure chamber is formed by the chuck housing, the bottom cover of the chuck and the shiftable the inner clamping piston. These elements are of course suitably sealed to impede the air to escape out of the pressure chamber. The pressure chamber expands, if filled with compressed air. This expansion occurs by moving the shiftable the inner clamping piston upwards resp. away from the bottom cover, pressing against the force exerted by the springs. The movement of the inner clamping piston within the chuck housing is preferably guided by one or more guiding openings located in the inner guidance channel of the chuck or by others, e.g. form-locking means, imposing a translative movement (meaning without rotation) of the clamping piston in axial direction of the chuck housing. Preferably said guiding openings interact which a section of the guiding pins attached to the inner clamping piston to allow a motion of the inner clamping piston in axial direction only.

The invention claimed is:

1. A clamping device for machine tools, comprising:
   a chuck having x-y-reference elements and z-reference elements; and
   a drawbar for clamping a pallet to the chuck in a clamping condition having an unclamped condition, the chuck radially moving clamping balls for clamping the drawbar at a corresponding tapered portion of the drawbar and pulling the drawbar inwards, wherein:
   the drawbar possesses at least one projection for entering a form-locking connection with the separate pallet by a rotational motion of that drawbar;
   the chuck has an inner guidance channel in which the drawbar is loosely positioned;
   the chuck includes means for interacting with the drawbar for the rotational guided motion of the between the clamping condition and the unclamped condition;
   the drawbar is turnable journalled mounted in the inner guidance channel is form-locking designed with respect to the inner guidance channel and with respect of the chuck to impede the drawbar's extraction out of the chuck, when the drawbar is in the clamping condition and when the drawbar is in the unclamped condition.

2. A clamping device for machine tools according to claim 1, wherein the drawbar is composed of one or more parts.

3. A clamping device for machine tools according to claim 1, wherein the inner guidance channel has an end contact surface which faces a corresponding stop surface on the drawbar for said form-locking and impeding therewith the drawbar's extraction out of the chuck against the pulling direction of the drawbar.

4. A clamping device for machine tools according to claim 3, wherein the end contact surface is orthogonally aligned to an axis of the guidance channel, whereby the drawbar has a projection forming the drawbar's stop surface, the projection is a ring shaped shoulder.

5. A clamping device for machine tools according to claim 1, wherein the drawbar has at least one guiding groove at its cylindrical surface.

6. A clamping device for machine tools according to claim 5, wherein the guiding grooves on the cylindrical surface of the drawbar comprise two S-shaped axially oriented grooves each having two straight groove portions and one intermediate angled groove portion connecting the straight groove portions.

7. A clamping device for machine tools according to claim 5, wherein the guiding grooves interact with corresponding guiding pins contained in an inner clamping piston which is allocated within the chuck housing, wherein the inner clamping piston is axially shiftable within the chuck housing without having the ability for rotational motion.

8. A clamping device for machine tools according to claim 7, wherein the guiding pins, allocated and interacting with the guiding grooves of the drawbar, cause the drawbar to fulfill a guided and determined rotational motion around its own axis when the clamping piston is moved in the axial direction of the chuck housing, wherein the guiding grooves allow a rotational movement of the drawbar of 45 degrees.

9. A clamping device for machine tools according to claim 7, wherein the chuck housing has a bottom cover, the drawbar has a tapered lower end section in contact with clamping elements allocated between said tapered lower end section of the drawbar and also a tapered section of the inner clamping piston,
   wherein relative movement of the inner clamping piston in direction of the bottom cover causes the clamping elements to pull and press the drawbar in the clamping chuck.

10. A clamping device for machine tools according to claim 9, wherein the chuck housing further contains springs, which are acting on the inner clamping piston and pressing the inner clamping piston in direction of the bottom cover,
    an expandable pressure chamber is formed by the chuck housing, the bottom cover and the shiftable inner clamping piston,
    wherein the pressure chamber can expand when filled with compressed air by moving the shiftable inner clamping piston away from the bottom cover against the force exerted by the springs.

11. A clamping device for machine tools according to claim 9, wherein the movement of the inner clamping piston within the chuck housing is guided by one or more guiding openings located in the inner guidance channel of the chuck,
    said guiding openings interact with a section of the guiding pins attached to the inner clamping piston to allow a motion of the inner clamping piston in axial direction only.

12. A clamping device for machine tools according to claim 1, wherein the chuck has a bottom cover provided with a through-going hole or opening.

13. A clamping device for clamping a pallet, the clamping device comprising:
- a chuck housing having an inner guidance channel;
- a drawbar for clamping a pallet to the chuck housing in a retracted clamping condition, the drawbar having an extended unclamped condition, the drawbar mounted in the inner guidance channel, the drawbar having at least one projection for entering a form-locking connection with the pallet by a rotational motion of the drawbar in the chuck housing;
- a piston, axially shiftable within the chuck housing and encircling the drawbar; and
- a plurality of clamping balls positioned to contact a tapered surface of the drawbar and a tapered surface of the piston during the axial shift of the piston.

14. The clamping device of claim 13 wherein: the tapered surface of the drawbar and the tapered surface of the piston are positioned so that during a portion of the shift, the balls exert an axial retracting force on the drawbar greater than a driving force applied to the piston.

15. The clamping device of claim 14 further comprising:
- a plurality of compression springs axially biasing the piston to provide at least a portion of the driving force.

16. The clamping device of claim 15 further comprising:
- a pressure chamber between the chuck housing and the piston positioned so that pressuring of the pressure chamber applies a force to the piston counter to the axial bias of the plurality of compression springs axially.

* * * * *